US007447555B2

(12) United States Patent
Skorepa (10) Patent No.: US 7,447,555 B2
(45) Date of Patent: Nov. 4, 2008

(54) METHOD FOR ENGINEERING A CONTROL SYSTEM

(76) Inventor: Bradley J. Skorepa, 21 Tack Ct., Edgewater, MD (US) 21037

( * ) Notice: Subject to any disclaimer, the term of this patent is extended or adjusted under 35 U.S.C. 154(b) by 300 days.

(21) Appl. No.: 11/481,621

(22) Filed: Jul. 6, 2006

(65) Prior Publication Data
US 2007/0293964 A1  Dec. 20, 2007

Related U.S. Application Data

(60) Provisional application No. 60/696,935, filed on Jul. 6, 2005.

(51) Int. Cl.
*G06F 17/50* (2006.01)
*G06F 19/00* (2006.01)
(52) U.S. Cl. .............................. 700/97; 703/1; 706/919
(58) Field of Classification Search .................. 700/17, 700/18, 83, 96, 97; 703/1, 2, 6, 7, 13, 14, 703/21, 22; 706/919–923; 707/100, 104.1; 716/1; 717/100, 101, 104
See application file for complete search history.

(56) References Cited

U.S. PATENT DOCUMENTS 5,485,620 A * 1/1996 Sadre et al. ................. 717/162
5,787,282 A * 7/1998 Tanaka et al. ............... 717/101
6,028,998 A * 2/2000 Gloudeman et al. ......... 717/108
6,643,555 B1 * 11/2003 Eller et al. .................... 700/83
6,701,325 B2 * 3/2004 Becker et al. ............ 707/104.1
6,826,432 B2 * 11/2004 Beck et al. .................... 700/18
7,043,311 B2 * 5/2006 Nixon et al. ................... 700/83
7,308,323 B2 * 12/2007 Kruk et al. ..................... 700/32
2004/0237065 A1* 11/2004 Brousek et al. ............. 717/101
2005/0010316 A1* 1/2005 Berker et al ................... 700/96
2007/0157149 A1* 7/2007 Grzonka et al. ............... 716/16

* cited by examiner

*Primary Examiner*—M. N. Von Buhr (57) ABSTRACT

The present method is a method to automate the repeatable process of application engineering microprocessor based control systems and creating the related documentation to submit for engineer approval and construct the control system. Prior to this method engineering every decision about point assignment, part selection, controller addressing et al was either made and only recorded upon the engineering documents or made in the field and either recorded manually or not at all. As the result when those engineering decisions were required elsewhere in the engineering documents individuals could only refer to those documents when retabulating the information. The present method allows a user to record all most all of the engineering decisions in a soft environment allowing the decisions to be repeatably used in every engineer document. As the result efficiency in the task of application engineering is increased and errors created as information is transferred are eliminated.

79 Claims, 6 Drawing Sheets

Fig. 1B Schematic of Tables, Steps & Relationships

METHOD FOR ENGINEERING A CONTROL SYSTEM

This application is based upon and claims priority from U.S. provisional application Ser. No. 60/696,935 filed Jul. 6, 2005, which is incorporated herein by reference.

BACKGROUND OF THE METHOD

1. Field of the Method

Applicants' method relates to a method for engineering a control system. More particularly, it relates to a software application that provides for automating the engineering of a control system.

2. Background Information

A control loop must include a sensor (an input point), a set-point, a controller and a controlled device (an output point). This definition allows the creation of a computer based automated process for engineering a system of control loops (a control system). Currently when engineering a control system comprised of off-the-shelf components, system control requirements are generated by identifying and defining input and output points (points), controllers and enclosures (an enclosed housing into which the controller, power conditioning and other necessary devices are mounted), and selecting the appropriate parts for each. If the control system requires, micro-processor based controllers can be selected and these microprocessor based controllers may or may not be networked together.

Networking will require a unique address for each controller. The controllers and points may require transformers or other power conditioning devices. In many cases one or more of the controllers are housed in an enclosure, and these enclosures are located singularly or in groups at one or more controller locations. The resulting control system may or may not include a PC based interface between the user and the control system.

The completed engineering for the control system usually includes manually generated engineering documents created using multiple dissimilar software applications. Engineering documents traditionally created with a drawing software application include but are not limited to: 1) a schematic network architecture drawing (if required by component selection and or the overall solution), 2) a system schematic drawing for each system, either with or without final terminations, showing the system components, the identified points and controllers, the systems control system solution parts and their locations relative to one another, 3) an enclosure schematic for each enclosure applied to the solution, showing the selected control system parts within the enclosure and their final terminations, 4) a method for depicting the final terminations for the field or enclosure mounted devices not shown in the enclosure detail, and 5) final terminations for equipment that is not a selected device of the control system but is either a sensor or a controlled device connected to the control system. Engineering documents traditionally created with a spreadsheet software application include but are not limited to: 1) a bill of material, for each solution or schematic, listing the selected control system solution parts, specific information regarding those parts their quantity and a cross reference to an abbreviation, tag, point and/or device name, and 2) schedules of the sized controlled or sensing parts. Engineering documents traditionally created with a word processing software application include but are not limited to: 1) a sensor and/or controlled device (hardwired point) list for each solution and 2) a sequence of operation for each solution. The remaining engineering documents typically include but are not limited to electronic softcopies or photocopied catalog and/or installation data sheets for each associated control system device selected. These cut sheets have been created and distributed by the manufacturer of the parts selected.

When the control system is installed more engineering drawings and supporting engineering documentation need to be generated. Installation documents that have to be manually generated using an as yet unnamed software applications typically include but are not limited to: 1) material orders for the selected parts, 2) nameplates for each parts, 3) wire labels for interconnected wiring, 4) installation data sheets for selected parts, and 5) commissioning checklists. If microprocessor based controllers are utilized, a database will also have to be generated for the controllers.

The micro-processor controller database for each solution in the control system as well as almost all of the information on the documents is directly related to the engineered points, controllers, and enclosures, and the parts and related part information selected for each application.

The engineering decisions made while naming points, selecting parts, choosing controllers et al have, prior to this method, only been recorded in the method of presentation used for that particular portion of the engineering. There is yet to be a way other than human observation and recording/transfer for engineer decisions recorded on one document to be used in other steps of the overall engineering process or when related across methods of presentation. Greater overall efficiency in the estimation, engineering and installation of control systems can be achieved by automating the engineering process. Because of the nature of control loops, the direct relationship between points, their characteristics and the engineering documents it is possible to fully automate the process of engineering control systems and creating the required engineering documentation. Automating the process would include inputting into a computer database the identified systems, points, controller locations, controllers, power conditioning devices, enclosures and networks, selecting the parts for each as appropriate, and using computer commands on the resulting database to generate documents. Additionally, keypunch errors can be eliminated since there is no manual transfer of information.

Previous patents automating the engineering of control systems have been limited to network connections or generating the controller database for the sequence of operation. Those attempts would only generate the executable database necessary to implement the sequences of operation for controllers (U.S. Pat. Nos. 6,028,998, 6,826,432, 6,701,325 & 5,485,620), may include the network engineering (U.S. Pub. App. No. 20050010316) or only deal with the network engineering (U.S. Pub. App. No. 20040237065). None of these patents include the generation of the engineering documentation as the primary deliverable of the software. This software application method automates the engineering and documentation for a complete installation of a control system including the database for microprocessor based controllers with the exclusion of the executable programming used for the sequences of operation.

Before the engineering begins, the control system needs to be estimated as a basis for proposing. There then remains the additional opportunity to maximize efficiency by starting the automation process prior to engineering when the user is only estimating and proposing a control system. Efficiency would be improved in the handoff from sales and estimating to the engineering responsibility if an application were developed so that all of the decisions made while estimating the control system could be directly utilized in the engineering. The process's of estimating and/or proposing control systems are not strictly defined like a control loop, but they are also directly related to the points and controllers et al and occur prior to the engineering. The Proposal or Price Quote represents the proposed agreement between the installer and user of the control system. In order to have the information cataloged during the process of estimating a control system, the application would have to be simple enough so that there is no added burden on the user estimating the control systems and there would have to be a user interfaces to the database that are compatible with the estimating function rather than the engineering function.

SUMMARY OF THE METHOD

The control system application engineering method ("method") described herein automates the process of engineering a control system. Additionally, the method has the ability to generate the entire controller database excluding the sequence of operations for microprocessor based controllers so featured. This method also simplifies estimating and engineering the installation of control systems by creating a structure that allows engineering decisions about a control system to be related in all presentations of information in the engineering documentation. By relating the information in all types of presentations within the engineering documentation, repetitive re-generation of mostly duplicate information is reduced and keypunch errors are eliminated when generating the professional, administrative, engineering and installation documents (documents) required for control system engineering. The present method has been created to 1) greatly increase the efficiency in generating the documents utilized while estimating, proposing, administering, engineering or installing control systems, 2) eliminate the possibility for clerical error in generating the documents and 3) generate some or all of the program database excluding the sequences of operation within microprocessor based controllers when those devices are utilized in the control system.

The present method includes a uniquely structured computer database, and pre-programmed computer commands (computer commands) executed on that database. The present method further includes pre-defined steps in the form of user interfaces to automate the process of engineering a control system and generating the documents that are directly related to the engineered points, controllers, power conditioning devices and enclosures and the parts selected for each.

For information, some input points engineered by the user in the commercial heating, ventilation and air-conditioning ("HVAC") market might include, but are not limited to temperature, pressure or humidity, in a pipe or a duct, or on an inside or outside wall. Some output points engineered by the user in the commercial HVAC market include, but are not limited to, control valves or dampers, or relay coils.

Utilization of computer commands greatly increases efficiency in generating the documents when the data is related across methods of presentation or software applications. This method eliminates the possibility of clerical human error associated with manually keypunching duplicate information into other presentations and software applications when generating the documents. By using computer commands executed on a computer database directly related to the engineered points, controllers, and enclosures, and the parts selected for each, this application can also generate efficiently and without keypunch error all of the required database excluding the sequence of operation if microprocessor based control devices are utilized.

Additionally, multiple typical points or multiple typical systems are efficiently engineered as a single point (Device Window, DW) or a single system (Solution) by the user using this method. This method also includes the possibility to define Solutions (an engineered application of controls for a single or typical system being controlled) and Device Windows (a representation of a single or typical point or controlled device) using a single action graphic person machine interface from a library of previously engineered solutions.

DETAILED DESCRIPTION OF THE PREFERRED EMBODIMENT

Figure 1A:
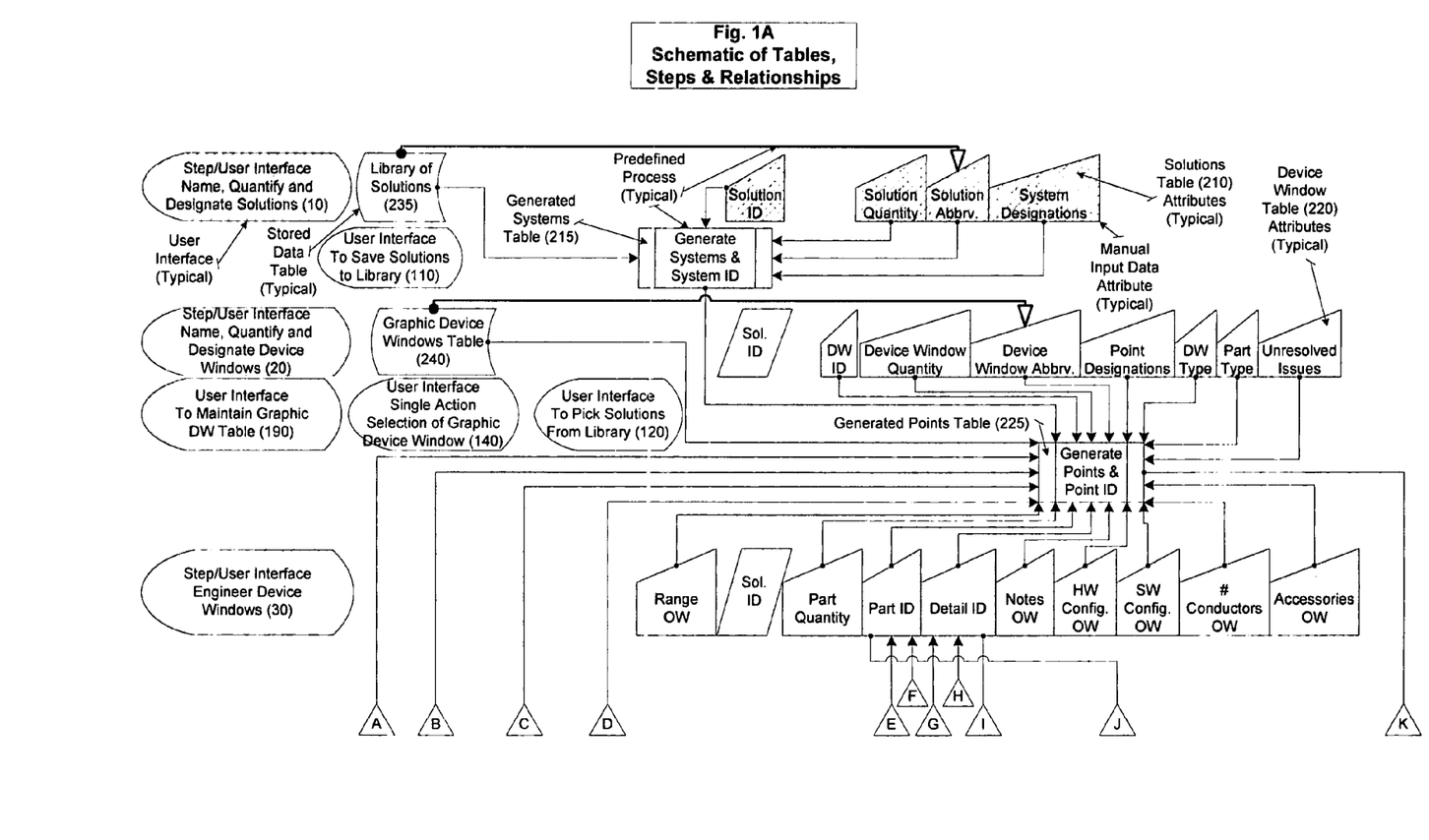
FIGS. 1A & 1B are flow chart representations of the related tables required by the method.
Figure 1B:
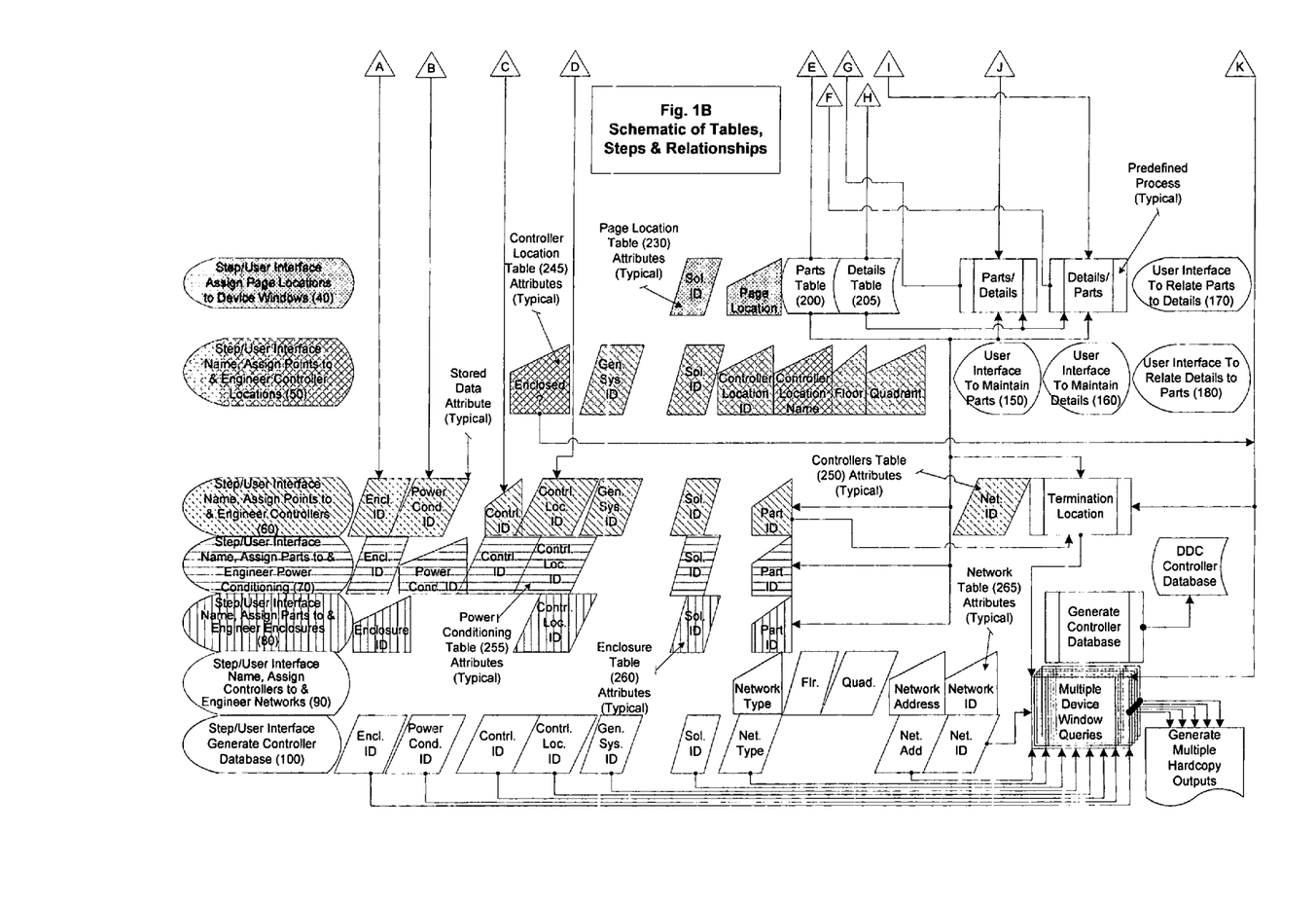
Figure 2A:
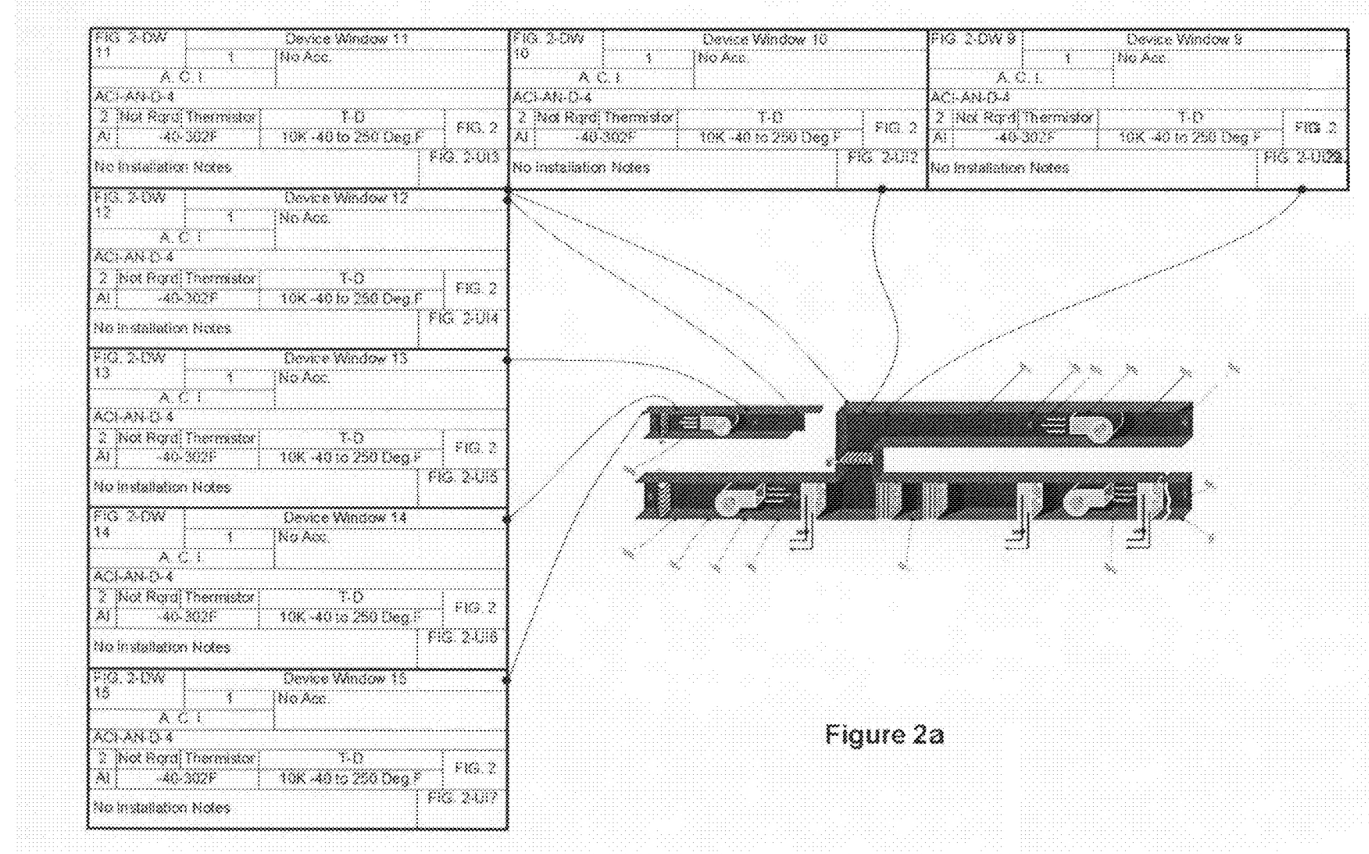
FIGS. 2a, 2b, 2c, and 2d are schematics of a sample system engineered by the software indicating 22 identical temperature inputs randomly positioned on a schematic of a typical HVAC system.
Figure 2B:
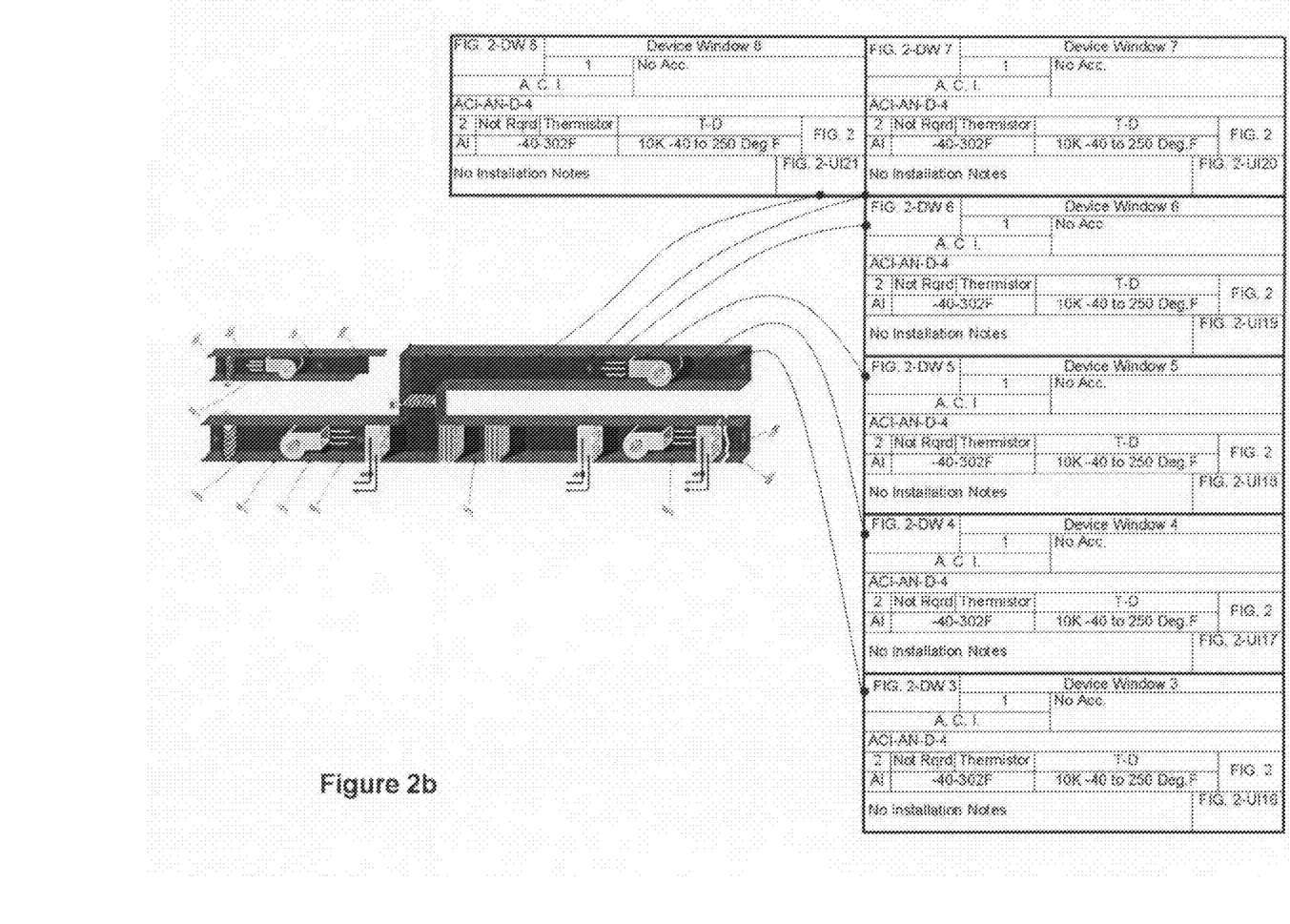
Figure 2C:
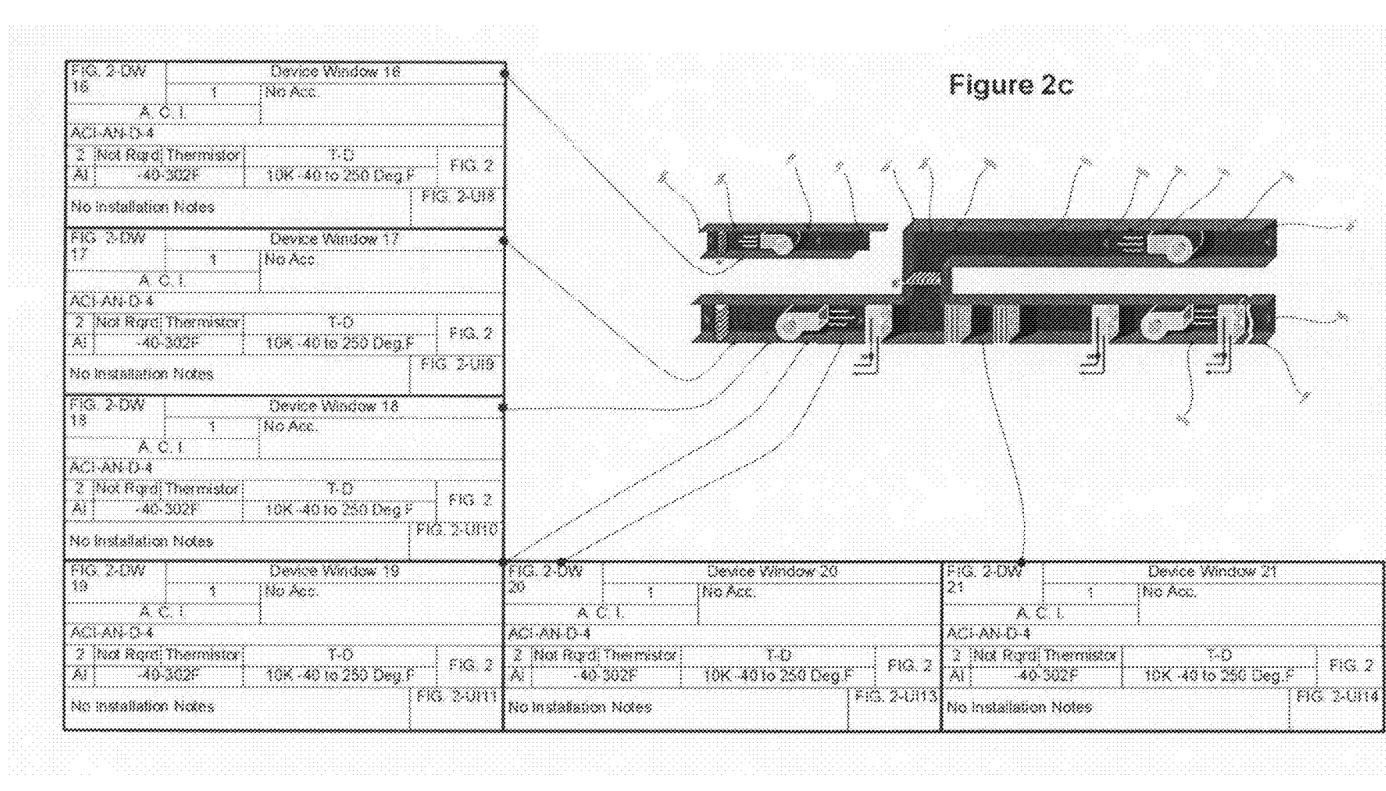
Figure 2D:
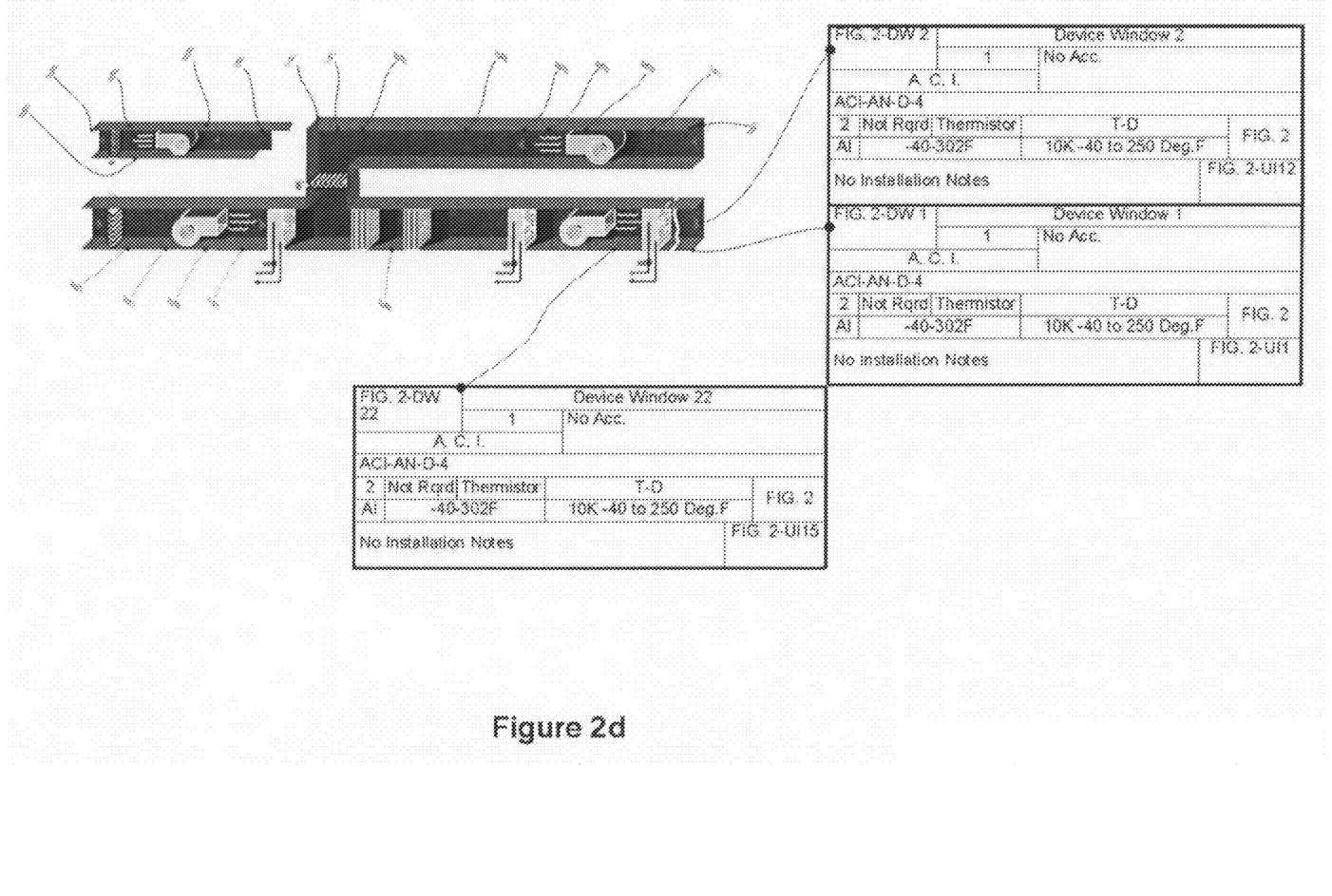

The control system application engineering method is the structure of the database, the preprogrammed computer commands managing the relationships between tables within the database and the defined iterative engineer steps in the software (User Interfaces) used to populate the database. The iterative steps, schematic representation of the tables and schematic relationships among the tables are summarized in FIGS. 1A & 1B. The attribute "TABLE Name" and all of the attributes that could be attributed to the Part or Details Tables have been omitted from each table representation in FIGS. 1A & 1B to allow room. The Tables in the computer database closely duplicate the iterative engineer steps used to populate the database. The tables in the computer database are the Previously Designed Device Parts Table ("Parts Table (200)"), a Previously Defined Details Table ("Details Table (205)"), Solutions Table (210), Generated Systems Table (215), a Device Window Table (220), Generated Points Table (225), Device Window Location Table (230), a Previously Defined Table of Libraried Solutions (235), a Previously Defined Table of Libraried Device Windows (240), and the Controller Location (245), Controller (250), Power Conditioning (255), Enclosure (260), and Network (265) Tables. Person/machine interfaces for each iterative engineer step allow the user to engineer the control system and populate the database. The iterative engineering steps are listed down the left margin of FIGS. 1A & 1B. They are Name, Quantify and Designate the typical and/or single system Solutions (10), Name, Quantify and Designate the typical and/or single DWs (20), final Engineer the parts, termination details and over-writes for the DWs (30), assign Page Locations to the DWs (40), Name, Assign points to and Engineer Controller Locations (50), Name, Assign points to and Engineer Controllers (60), Name Assign parts to and Engineer the Power Conditioning Devices (70), Name Assign parts to and Engineer the Enclosures (80), Name, Assign Controllers to and Engineer the networks (90), and finally Generate the non-executable Database (100) if so required. Other required User Interfaces are also visible in FIGS. 1A & 1B. Each of those is described in this Detailed Description. Also required but not part of this method are the computer hardware and operating, and database and drawing application software to support the method.

The variety of control system engineering is such that the presentation of the installation engineering can be unique to the market the control system is being applied to. A control system engineered for commercial HVAC may very well have additional presentation requirements than those shown here. The attributes included in the discussion of this method represent the minimum required to engineer any control system. Additional presentation requirements will not change the table structure or the relative relationships between the tables, but might require that for a record in one or more of the tables, one or more additional attribute not mentioned here will need to be included, kept track of, and related to a method of presentation. Because of this known fact part of this method, is that the tables, the attributes that relate the tables to each other, and the minimum attributes in the tables, are able to have attributes added as required by any market the control system is engineered for or the method is applied to.

The Parts Table (200) is a list of Part Records that includes at least one and all of the possible parts that could and can be applied by the user to the control system. Each Part Record in the Parts Table (200) includes all of the unique attributes related to the part that will be required by every aspect of the documents or other data manipulation within the method. Some but not all of the possible part attributes include but are not limited to: 1) the data sheet part number, 2) the part manufacturer, 3) the vendor who provides the part, 4) the vendor part number, 5) the supply voltage if required, 6) the sensed range or control voltage of the part, 7) the output signal of the part, 8) the software configuration of the part, 9) how many conductors are required to terminate at the part, 10) a termination detail name that depicts how to terminate the part, 11) the list price of the part, 12) the cost of the part, 13) the name and softcopy location of the catalog data sheet for the part, 14) the name and softcopy location of the installation data sheet for the part, 15) the power usage of the part, 16) a description of the part, 17) the type of the part i.e. two-position or analog point, input or output point, or a controller or enclosure, 18) the planar area of the part when mounted, 19) written installation notes regarding the parts and how the part is to be set-up before operation, 20) an associated parts list including required accessories that have separate part numbers, 21) a description of how to commission the part, 22) an associate icon for depicting the part on the schematics et al, and 23) a cost code to sort the part for analysis. The part attributes are not limited in any way and can include any specific attribute that is definable for any part according to the requirements of the user. The specific attribute that relates the Parts Table 200 record attributes to all other tables in the database is Part ID. There is a many-to-many relationship between the Parts (200) and Details (205) Tables, and a many-to-many relationship between the Details (205) and the Parts (200) Tables. There is the requirement within the method to have a user interface to input and maintain the Part Records.

The Details Tables (205) is a list of Detail Records that includes at least one and all of the possible termination details that could be applied by the user to the control system. Each detail record in the Previously Defined Details Table (205) includes all of the unique attributes to the termination detail that will be required by every aspect of the documents or other data manipulation within the method. Some but not all of the possible previously defined detail attributes include but are not limited to 1) Detail Name, 2) Detail softcopy representation location. The termination detail attributes in addition to those minimums previously listed are not limited in any way and can include any specific attribute that is definable for any termination detail according to the requirements of the user. The specific attribute that relates the Detail Table (205) record attributes to all other tables in the database is Detail ID. There is a many-to-many relationship between the Parts (200) and Details (205) Tables, and a many-to-many relationship between the Details (205) and the Parts (200) Tables. There is the requirement within the method to have a user interface to maintain the Detail Records.

"Infinite Possibilities" is the term used herein to describe the situation where every possibility of application for a part or a detail or the possible attributes for either parts or details cannot be currently predicted. Therefore, the method must be designed to accommodate the occurrence of that that is presently unknown but could become possible. Infinite Possibilities dictate that the structure of the tables and relationships in the method must accommodate attributes and applications that can not be limited. The infinite possible attribute flexibility of the all the Tables and specifically the Parts (200) and Details (205) Tables is integral to the method. The many-to-many relationships between the parts and details and the manual assignment between the two, and the many-to-many relationships between the details and parts and manual assignment between the two are specifically part of this method. In this method, with regard to the parts, details and infinite possibilities, the application is designed with many-to-many relationships between the Parts (200) and Details (205) Tables. This method is unique in that the relationships between the parts and the details are many-to-many and that the relationships are manually assigned by the user and retained in the database. The method has the requirement that there be a user interface to maintain the relationships between the parts and the details and the relationships between the details and the parts. The result of this design is discussed more in the Engineer the Parts and Details for the DWs User Interface.

The Solution Table (210) is a list of Solution Records that includes at least one and all of the solutions in the control system that the user defines. The Solution Record is a representation of each non-typical system engineered in the control system. Each solution record in the Solution Table (210) includes all of the unique attributes related to the solution that will be required by every aspect of the documents or other data manipulation within the method. Some but not all of the possible solution attributes include but are not limited to 1) Solution ID, 2) Solution Quantity, 3) Solution Abbreviation, 4) System Designations and 5) Solution Name. The solution attributes in addition to these minimums are not limited in any way and can include any specific attribute that is definable for any solution according to the requirements of the user. There is a many-to-one relationship between the Device Window and Solution Tables (210) related by the Solution ID.

Control systems contain many points and systems that are typical. This occurrence of "typicals" must be taken into account if a successful database engineering tool for control system application engineering is to be designed. This method specifically accommodates typical systems and points by designating Solutions as individual or typical systems and DWs as individual or typical points.

The present method allows a single system or multiple occurrences of typical systems to be engineered as a single group of Device Window Records and represented in the user interfaces as a single Solution. Multiple occurrences of typical Systems are engineered by the user as a single Solution in the Name, Quantify, and Designate Solution User Interface (10). In this interface the user inputs the Solution Abbreviation, Solution Name, Solution Quantity and System Designations. A Designator Variable is used to designate a location in the Solution Abbreviation and Solution Name in order for the insertion of System Designations. Once the Designator Variable is identified by the user, the application executes computer commands that insert the defined System Designations in place of the Designator Variable and results in systems in the Generated Systems Table (215) that are the expansion of the single Solution Record in the multiple designations and defined quantity. The user can dynamically engineer a solution and affect multiple systems as designated and quantified. The solution typically consists of multiple DWs. Note that typical solution DWs are expanded by the computer commands into generated Points Table (200) while also expanding solutions into Generated Systems Table (215). This typical Solution expansion based on the System Designations is unique to this method.

The Generated Systems Table (215) is not editable directly by the user and consists of the same attributes as the Solution Table (210). The Generated Systems Table (210) includes those solutions expanded to the quantity and designated systems so defined in the Name, Quantify and Designate Solution (10).

The Device Window Table (220) is a list of Device Window Records that includes at least one and all of the DWs in the control system that the user defines. The Device Window Record is a representation of each non-typical engineered input or output point (point) in the control system. Each Device Window Record in the Device Window Table (220) includes all of the unique attributes related to the Device Window Record, not related to the part or detail record selected for the DW that will be required by every aspect of the documents or other data manipulation within the method. Some but not all of the possible attributes for a Device Window Record include but are not limited to 1) DW ID, 2) DW Name, 3) DW Abbreviation, 4) DW Point Type, 5) DW Part Type, 6) DW Quantity, 7) Point Designations, 8) Total Part Quantity, 9) Part ID, 10) Detail ID, 11) Notes Overwrite, 12) Hardware Configuration overwrite, 13) Software Configuration Overwrite, 14) Conductors Overwrite, 15) Accessories Overwrite, 16) Unresolved Issues, and 17) Page Location. The relationship between the Device Window Record (220) and the Parts Tables (200) is a one-to-one relationship related by Part ID. The DW attributes are not limited in any way and can include any specific attribute that is definable for any solution according to the requirements of the user. The relationship between the Device Window Record (220) and the Details Tables (205) is a one-to-many relationship related by Detail ID.

The present method allows a single point or multiple occurrences of typical points to be engineered and represented in the user interfaces as a single DW or in the database as a single Device Window Record. Multiple occurrences of typical points are engineered by the user as a single DW in the Name, Quantify and Designate Device Window User Interface (20). In this interface the user inputs the DW Abbreviation, the DW Name, the DW Quantity, Point Designations, DW Point Type and DW Part Type. A Designator Variable is used to designate a location in the DW Abbreviation and DW Name in order for the insertion of the Point Designations. Once the Designator Variable is identified by the user, the application executes computer commands that insert the defined Point Designations in place of the Designator Variable and results in points in the Generated Points Table (225) that are the expansion of the single Device Window Record in the multiple designations and defined quantity. Once the Device Window Designations are defined, the user can dynamically engineer one DW and affect multiple Point Records from the Name Quantify, and Designate Device Windows User Interface (20) or in the Engineer DW User Interface (30). This typical DW expansion based on the Device Window Designations is unique to this method.

The Generated Points Table (225) is not editable directly by the user and consists of the same attributes as the Device Window Table (220). The Generated Points Table (225) includes those DWs expanded to the quantity and designated points so defined in the Name and Quantify Device Windows User Interface (20).

The development of the Device Window Record is the direct result of the objective to eliminate keypunch errors. To eliminate keypunch errors, data in the Device Window Record needs to be related across different presentations of date and possibly across software applications. Relating data across presentations of data and possibly across software applications requires that all the data associated with a point that, prior to this method, was traditionally presented in different locations in the engineering documents, has to be related and complied in a concise format.

Analysis generated two factors that affected the Device Window Record. The first factor affecting the design of the Device Window Record was determining which attributes should be visible for presentation in the documents for a Device Window. Traditionally, nine of the Device Window Record attributes—Abbreviation, Name, Power, Part Number, Manufacturer, Accessories, Total Quantity, Range, and Notes have been part of the Bill of Material on the engineered documents. They have never been presented together in this way before. Five attributes of the Device Window Record— Conductors, DW Type, Hardware and Software Configuration, and Termination Detail are included because the design intent is to show in one location all of the data required when installing, programming or commissioning a terminated point. These five attributes traditionally were never presented or cataloged in the engineering documents directly. The remaining two attributes, Enclosure and Channel are the result of the Controller Location, Controller, and Enclosure assignments that occur in the engineering steps.

The second factor impacting the Device Window Record design is the aspect of the analysis that required the distinction between the DW and the Device Window Record. The second factor also affected the design of the Engineer Device Window User Interface (30).

Infinite Possibilities is also used to describe the condition that some Details allowed multiple DWs with different DW Types to be related to the same Detail. Additionally the term also includes the fact that there will inevitably be applications of parts to DWs that conflict with the previously defined attributes stored in the Parts, Details or Libraried Solutions Tables. It also describes the condition where there is the greater number of total parts for the DW than the product of the Solution Quantity and the DW Quantity. The method cannot handle the case where the total part quantity is less than this product. Accordingly, to be effective, the software design must include the flexibility for the user to be able to over-write the previously defined value with a value that is unique to the case for some of the attributes from the Detail Record as they relate to the Device Window Record. The design of this control system application engineering method includes the ability to over-write those attributes that are affected by this need. The over-writable attributes are Accessories, Total Quantity, Range, Number (#) of Conductors, Hardware and Software Configuration, and Notes.

The present method consists of specific preprogrammed computer commands "Queries" to all Tables. These results of these "Queries" provide the concise organized way to relate the data efficiently across data presentations and software applications. The attributes in the Device Window Record are the synthesis of the unique data associated with each point within a project that, when related to all other Tables, results in all required combinations of data traditionally shown in individual locations throughout the control system engineering documents. These Queries of the Device Window Records (QDWR) on the Device Window Table (220), related to the Solution Name (210), Page Locations (230), Controller Locations (245), Controllers (250), Power Conditioning Devices (255), Enclosures (260), Networks (265), Parts (200) and Details (205) Tables, are used in every case as the basis for related data to be presented where this or other application software presents aspects of the engineering documents for a control system. The present method is designed so that wherever the Device Window Record is present in a user interface, only those attributes that are germane are visible, and only those that are affected by the engineering step can be changed.

The Device Window is the most prevalent way this method presents or relates a subset of the data from a QDWR. Prior to this method, engineering data about the points was traditionally presented in the engineering documents as a function of the application media used to generate the actual presentation of the data. Now that this method allows the control system engineering data to be tabulated in a database easily related between presentations or software applications, the presentation format of data is no longer limited by the application media used to generate the presentation. Removing the paradigm associated with the application media allowed the development of a single place where anyone using the engineering documents can visually find all the engineering data associated with a point. A new way to present the data was created. Referred to as the Device Window, it is a concise presentation that easily complies in one location all of the engineering data that traditionally was spread about on numerous locations or pages in the engineering documents. There is the added benefit that this presentation simplifies all attempts by a document user to find the data needed about a point. The DW is presented in the engineering documents and in the application. As mentioned earlier, the compilation resulted in a significant portion of the attributes in the Device Window Record.

The DW includes a subset of sixteen attributes from the Device Window Table (220) that are visible in this user interfaces and can be affected by the user. They are visible as the result of a QDWR. The DW engineering is partially accomplished while in the Name, Quantify and designate Device Window User Interface (20). The balance of the engineering takes place in the Engineer Device Window User Interface (30). In the Engineer Device Window User Interface (30), some of the sixteen attribute's values are manually input; others are related to the Part or Detail selected for the DW by the user, or can be inherited from a previously designed Device Window Records, or inherited as part of a group of records from a library of previously designed Device Window Records.

The Engineer Device Window User Interface (30) allows the user to continue engineering the Device Window Record by either picking a part or a detail from the part or detail drop down list. The DW Part Type selected by the user in either the Name, Quantify and Designate Device Window User Interface (20) or in the Engineer Device Window User Interface (30). Selecting a value for this attribute allows the application to short list those parts presented for selection in the Engineer Device Window User Interface (30) part drop down. The detail drop down has been filtered to only those details that are related in some way to the part type selected in the Name, Quantify and Designate Device Window User Interface (20). Once either the part or the detail is selected, the application further shortens the list of possible selections of the opposite attribute allowing the user to narrow the search from either source. Of the sixteen visible DW attributes in the user interface, Manufacturer, Range and Power Required are related to the part ID selected. Conductors, Notes, Hardware and Software Configuration and Accessories are related to the detail ID selected. The Enclosure and Channel are derived from the result of other steps in the present method. Total Part Quantity and the five over-writes are all editable. Part and Detail ID's are selectable and the DW Name and Abbreviation are visible and editable in this User Interface. All information for each DW is expanded into the Generated Points Table (225).

This method creates the flexibility required in control system engineering to utilize a table of attributes for details and parts and apply them to infinitely possible point applications and still do so in the format required by a database and beneficial to the user. The successful determination of the appropriate presentation of the Device Window Record as a DW with relationships to Part (200) and Detail (205) Tables and the ability to override appropriate attributes allow the user the flexibility to engineer every possible and yet unpredictable combination of point, part and detail from a database. The structure of the relationships between Parts (200), Details (205) and Device Windows (220) Tables accommodates infinite possible attributes in either table.

A ring of DWs surrounding the system schematic with leaders to relative device locations proved to be the most efficient way to automatically present point data.

In order to present the DW information on a ring of DWs as shown in FIGS. 2a, 2b, 2c, and 2d, the DW page location must be defined when the DW is presented in schematic form. This is accomplished in the Assign Page Location User Interface (40). In this interface the user simply chooses one of the locations in the ring of DWs to be the location where information from a specific DW is displayed. The user will be required to move the page locations of the DWs around within the possible page locations. Therefore the ability to swap page locations is required. There is a one-to-one relationship between the DW Table (220) and the Page Location Table (230).

To complete the control system engineering, the user must relate each point to a controller. Points are typically assigned to controllers based on the proximity to possible locations to locate. Controllers are either enclosed or not. Assignment of points to controllers in control systems does not always result in a one-for-one relationship between systems and enclosures or systems and controllers. Enclosure locations and proximity point assignment often result in multiples or portions of systems being connected to one controller in a single enclosure, and/or multiples or portions of systems being connected to multiple controllers within a single or multiple enclosures. Multiple enclosures may also be mounted together in one common controller location. Therefore, a method of organizing the infinite possible arrangement of points, enclosures, controllers and controller locations is required when automating control system engineering.

Analysis revealed that in order to accommodate the relationships that databases require points must first be assigned to controller locations. Only then can an organized relationship be established between controller locations, enclosures, controllers and points. In order to maintain the relationships that databases require, controllers also have to be assigned to controller locations and points are then assigned to the controllers that only have common controller locations. Finally the controllers, if enclosed, can only be assigned to enclosures that have common controller locations. Power Conditioning Devices are not Controller Location dependent.

The result is a three step point assignment process that requires controllers, enclosures and controller locations to have separate tables. Two interfaces are required to allow the user to manipulate the relationship between points and, Controllers and Controller locations. A third user interface is used to engineer the enclosures within each controller location after point and controller assignment has been made.

The first interface allows the user to manipulate the points with respect to controller locations. This is the engineering step Name, Assign Points to & Engineer Controller Locations (50). In our design, the user views filtered and sorted lists of points by system, navigates between systems and points, knows visually whether the points are either assigned or not assigned to a controller location, assigns them to a controller location, manages and introduces controller locations and still maintains the relationships between controller locations, systems and points that a database requires.

The Controller Location Table (245) is a list of Controller Location Records that includes at least one and all of the controller locations in the control system that the user defines. The Controller Location Record is a representation of each Controller Location engineered in the control system. Each Controller Location Record in the Controller Location Table (245) includes all of the unique attributes related to the controller location that will be required by every aspect of the documents or other data manipulation within the method. Some but not all of the possible controller location attributes include but are not limited to 1) Controller Location ID, 2) Controller Location Name, 3) Controller Location Floor, 4) Controller Location Quadrant, and 5) whether the controller location is an enclosed controller location or not. The controller location attributes are not limited in any way and can include any specific attribute that is definable for any controller location according to the requirements of the user. There is a many-to-one relationship between the Generated Points Table (225) and the Controller Locations Table (245) related by the Controller Location ID.

Similar to assigning points to controller locations, the second interface is used to assign points to and name and engineer controllers. The Name, Assign Points To and Engineer Controllers User Interface (60) allows the user to view the filtered lists of points by Controller Location, navigate between controller locations, manage and introduce controllers, and/or choose a controller based on the inputs and outputs. To continue the process the user then must assign the points to the controllers. The same interface allows the user to assign points to controllers and visually know that the points visible are either assigned or not assigned to a controller.

The Controllers Table (250) is a list of Controller Records that includes at least one and all of the Controllers in the control system that the user defines. The Controller Record is a representation of each Controller engineered in the control system. Each Controller Record in the Controller Table (250) includes all of the unique attributes related to the controller that will be required by every aspect of the documents or other data manipulation within the method. Some but not all of the possible controller attributes include but are not limited to 1) Controller ID, 2) Controller Name, and 3) Part ID. The controller attributes are not limited in any way and can include any specific attribute that is definable for any controller according to the requirements of the user. There is a many-to-one relationship between the Generated Points Table (225) and the Controller Table (250) related by the Controller ID.

After the points are assigned to individual controllers, the termination location of those points also needs to be determined. This step is executed by computer commands automatically based on fixed heuristics using the alphabetical order, whether the points are inputs or outputs, analog or binary and the point capacity (number of Channels) of the selected controller. Using computer commands, this embodiment automatically assigns the analog inputs alphabetically from the lowest numbered controller input and automatically assigns the binary inputs in reverse alphabetic order from the highest numbered controller input. Similarly, computer commands automatically assign the analog outputs alphabetically from the lowest numbered controller output and the binary outputs alphabetically in reverse order from the highest numbered controller output. The result is unused controller channels toward the center of the controller's channels. These open channels toward the center allow additional analog or binary points to be assigned and still remain grouped with other analog or binary points. The Name, Assign and Engineer Controller UI (60) has features necessary to ensure that the controllers chosen will have the necessary inputs and outputs.

Many of the parts used in control systems usually require some type of power source or conditioning. This typically is a transformer but can also be a power supply. This requirement is taken into account in the next step of the application design. In the Name, Assign and Engineer Power Conditioning User Interface (70), the user is presented with a visible list of all power consuming parts in any given controller location and has the ability to create, name and otherwise manage the transformers at each specific controller location. Within that controller location, the user then has the ability to assign power consuming parts to the power conditioning devices. The user can repeat this process for every controller location.

The Power Conditioning Device Table (255) is a list of Power Conditioning Device Records that includes all of the Power Conditioning Devices in the control system that the user defines. The Power Conditioning Device Record is a representation of each Power Conditioning Device engineered in the control system. Each Power Conditioning Device Record in the Power Conditioning Device Table (255) includes all of the unique attributes related to a Power Conditioning Device that will be required by every aspect of the documents or other data manipulation within the method. Some but not all of the possible Power Conditioning Device attributes include but are not limited to 1) Power Conditioning Device ID, 2) Power Conditioning Device Name, and 3) Part ID. The Power Conditioning Device attributes are not limited in any way and can include any specific attribute that is definable for any Power Conditioning Device according to the requirements of the user. There is a many-to-one relationship between the Generated Points Table (225) and the Power Conditioning Device Table (255) related by the Power Conditioning Device ID.

Many of the parts used in control systems are mounted in an enclosure—typically power Conditioning Devices and controllers on major equipment. This requirement is taken into account in the Name Assign Part to and Engineer Enclosure User Interface (80). In the Name, Assign parts to and Engineer Enclosure User Interface (80) the user is presented with a visible list of all parts in any given controller location and has the ability to create, name and otherwise manage enclosures at each specific controller location. Within that controller location, the user then has the ability to assign parts to be mounted in the enclosures. The user can repeat this process for every controller location.

The Enclosure Table (260) is a list of Enclosure Records that includes all of the Enclosures in the control system that the user defines. The Enclosure Record is a representation of each Enclosure engineered in the control system. Each Enclosure Record in the Enclosure Table (260) includes all of the unique attributes related to the enclosure that will be required by every aspect of the documents or other data manipulation within the method. Some but not all of the possible enclosure attributes include but are not limited to 1) Enclosure ID, 2)

Enclosure Name, and 3) Part ID. The enclosure attributes are not limited in any way and can include any specific attribute that is definable for any enclosure according to the requirements of the user. There is a many-to-one relationship between the Generated Points Table (225) and the Enclosure Table (260) related by the Enclosure ID.

The method also provides for engineering the networks. In the Name, Assign Controllers to and Engineer Network User Interface (90) the user is presented with a list of controllers and a method by which their relative proximity to one another is visible. This proximity is available as the result of the Floor and Quadrant attributes of the Controller Locations Table (245). The user has the ability to create and name networks and assign controllers to those networks.

The Networks Table (265) is a list of Network Records that includes all of the Networks in the control system that the user defines. The Network Record is a representation of each Network engineered in the control system. Each Network Record in the Network Table (265) includes all of the unique attributes related to the Network that will be required by every aspect of the documents or other data manipulation within the method. A couple but not all of the possible Network attributes include but are not limited to 1) Network ID and 2) Network Name. The Network attributes are not limited in any way and can include any specific attribute that is definable for any Network according to the requirements of the user. There is a many-to-one relationship between the Generated Points Table (225) and the Network Table (265) related by the Network ID.

One of the possibilities not possible prior to the present method is the ability to use computer commands on the Point Record database and directly create the database on microprocessor based controllers. This method accomplishes this by showing in the Generate Controller Database User Interface (100) all of the controllers in the control system. QDWR then compile all of the related information from the networks, controllers, point assignment, and Device Window Record information into the appropriately formatted file that can be used directly in a microprocessor based controller. The present method also allows the user to, as the direct result of executing computer commands on a database, program microprocessor based controllers exactly as they are engineered. This is possible for a single controller, multiple typical controllers or an entire control system.

By compiling control system point engineering data in a database, this method allows the user to save for future use a Device Window Record, and/or Solution (a group of previously engineered Device Window Records). This method allows the user to improve engineering efficiency by using a single command to recall either a saved Device Window or Solution. One way the method allows the user to take advantage of previously designed Device Window Records is by allowing a complete solution to be copied from a Library while in the Pick Solutions from Library User Interface (120). The second way is a method for graphically assigning a single previously designed Device Window Record to a designed Solution based a single action. This can be accomplished in the Graphical Device Window User Interface (140).

The method allows a complete solution of Device Window Records to be copied into the reference Library from any control system using the Save Solution to Library User Interface (110). This is also the requirement to maintain saved Graphical DWs using the Maintain Graphical Device Windows User Interface (190). In either case the parts, termination details, DW locations and all other engineering data are copied from a/all saved Device Window Record into the appropriate tables for the Solution being engineered.

The ability to use previously designed DWs or groups of DWs (Solutions) from a library and/or to do so graphically is a unique feature of this method.

Because of the database structure disclosed herein, control system application engineers can now use pre-programmed computer commands to execute processes that were previously manually tabulated from the engineer decisions recorded in the engineering documents.

The present method will use computer commands to generate single or multiple page engineered documents for each solution including, if chosen, a system schematic including a ring of DWs, an enclosure drawing automatically select and place termination details onto a drawing that are directly related to the parts selected.

The present method will use computer commands to generate single or multiple page engineered documents for each solution including, if chosen, Bills of Material.

This method will, at the users command, automatically generate, Material Requests, Commissioning Worksheets and Points Lists.

This application software will use computer commands to select and create softcopy file of the appropriate catalog or installation data sheets for only the parts chosen for the control system. The control system application engineering method has the ability to generate the documents based on multiple profiles. In one profile—Solutions—the engineering documents are based on typical solutions. In another profile—Construction—the engineering documents are based on the systems that result from the expansion of solutions using the system designations.

Other hardcopy outputs include point and system legends, enclosure nameplates, device and conductor labels.

There is the benefit of the possibility of using the method to generate any unique combination of attributes that is a function of the Point Records into almost any linked software application or presentation format. The ability to choose from all of the point record attributes in different software applications linked to the database greatly improves the efficiency of creating the documents. There is no limit on the format or content of the hardcopy output that can be created for the benefit of the user.

This method is unique because control loops are definable. As such, the steps and data required to engineer a control system is known and repeatable. This method is the result of tabulating and relating unique tables of records and distinguishing what minimum attributes are required and unique, and generating repeatable steps for application engineering a system of control loops.

The present method overcomes the specific challenges associated with applying database concepts to control systems engineering. Application of database concepts quickly reveals the need to separate the point record (single DW) and the part and detail records into dedicated tables. Analysis of the point record resulted in recognizing the additional need to catalog data (conductors, point configuration, wire detail and power) that was previously not presented, or was presented individually with the point but not cataloged on a list or in a schedule. The challenge of infinite possibilities was overcome with over-writable attributes so that any part or detail could be related to any point. Additionally any attribute that is needed can be cataloged by simply adding it to the appropriate table. Infinite Possibilities also resulted in interfaces for point, controller, power conditioning device and enclosure assignment allowing the required flexibility to have any point assigned to any controller location, any point assigned to any controller at a common controller location, any or multiple controllers assigned to any enclosure with a common controller location, and any power conditioning device assigned to any of the above. Typical systems and points are deftly handled so that typical points or systems can be engineered as a single point (DW) or system (Solution). This method has taken advantage of the unique relationship for a control loop, developed specific tables, maintained database relationships, created user interfaces, and still accommodated infinite possibilities and typical points and systems. The method is successful at incrementing the engineering steps, distinguishing and recording the unique data at each step while still maintaining the relationships that databases require. In so doing, the process of engineering control systems has been automated.

While the present invention is not intended to be exclusively controlled by computer programs or algorithms, it is intended that the present invention can be implemented and controlled by computer programs or algorithms on an individual computer system, over the Internet, or on a computer network. Therefore, the present invention contemplates a series of computer algorithms and methods by which the present invention is implemented and controlled. Thus, in some of the descriptions herein, the present invention is presented partly in terms of process steps and operations of data bits within a computer memory. An algorithm is here, and generally, conceived to be a self-consistent sequence of steps leading to a desired result. These steps are those requiring physical manipulations of physical quantities. In the present invention, the operations referred to may be automated, machine operations done by a computer or similar device performed in conjunction with a human operator.

The present invention relates to the methods for operating such devices, and processing electrical, magnetic, optic, or other physical signals to generate other desired physical signals. It further relates to a computer program and the control logic contained therein. The present invention also relates to apparatus for performing these operations. The apparatus may be specially constructed for the required purposes or it may comprise a general purpose computer selectively controlled or reconfigured by a computer program stored in the memory of the computer. Further, because the present invention is intended to include a network of participants with no geographic limitations, it is contemplated that to better implement the system of the current invention, at least part of such implementation may take place on a computer network or the Internet. The method presented herein is not inherently related to any particular computer or other apparatus. Similarly, no particular computer programming language is required. The required structure, although not machine specific, will be apparent from the description herein. Additionally, even though a specific device or software application may, or may not, be mentioned in conjunction with a step, or algorithm, or action, it is intended that any appropriate device or software application necessary or capable of implementing that step, or algorithm, or action is anticipated herein. For example, if a step calls for the input of data, it is contemplated that any appropriate devices such as, but not limited to, various input devices, output devices, data storage devices, data transfers devices, could be used and are anticipated herein.

The present invention may be embodied within a computer system used for engineering a control system where the method of the present invention is enabled thereon through instructions for controlling the computer system to engineer a control system. "Computer system" is not intended to be limiting in that any type of computer or computer network, such as a local area network or the Internet, are contemplated. The present invention may also be embodied upon an article of manufacture having a computer readable medium containing computer readable program code having instructions for controlling the computer system to engineer a control system. It is anticipated that "article of manufacture" could comprise any medium or embodiment capable of supplying or loading computer code onto a computer system, such as without limitation, compact disks (CD's) or digital video disks (DVD's).

Although the method has been described with reference to specific embodiments, this description is not meant to be construed in a limited sense. Various modifications of the disclosed embodiments, as well as alternative embodiments of the methods will become apparent to persons skilled in the art upon the reference to the description of the method. It is, therefore, contemplated that the appended claims will cover such modifications that fall within the scope of the invention.

I claim:

1. A method for engineering a control system, comprising:
receiving user input information;
analyzing said user input information in order to engineer a DW record by independently assigning a part and a termination detail for said DW record;
storing for every solution said user input information as DWs in a device window table;
using computer commands to expand single and typical DWs as individual points;
using computer commands to expand single and typical solutions as individual systems;
assigning for every point in every system a controller location;
engineering said controller locations;
assigning for every point in every system a controller;
engineering said controllers.

2. The method of claim 1, wherein said method contains at least two tables, a parts table and a detail table.

3. The method of claim 2, wherein said parts table contains at least one part, said parts are grouped by part type, and include at least one attribute.

4. The method of claim 1, wherein said method contains at least one device window record in a device window table.

5. The method of claim 1, further comprising of points for sensing (input) or control (output) for the control system.

6. The method of claim 5, wherein said point is stored as said device window record consisting of at least two attributes.

7. The method of claim 4, wherein said device widow record contains at least one attribute from said parts table and at least one attribute from said detail table.

8. The method of claim 2, wherein said parts table has many-to-many relationships with said termination detail table, said terminations detail table has many-to-many relationships with said parts table; and wherein that the relationships between details and parts, and parts and details are independent of one another.

9. The method of claim 2, wherein said parts table can contain any additional attributes relating to the said part.

10. The method of claim 9, wherein said additional attribute is any of: manufacturer, vendor, range, part number, and power.

11. The method of claim 9, further comprising: allowing a user to view, input data, manipulate and store the parts table.

12. The method of claim 2, wherein said detail table may contain an additional attribute relating to said termination detail.

13. The method of claim 12, wherein said additional attribute is any of: software configuration, accessories, hardware configuration, conductors, and notes.

14. The method of claim 12, further comprising: allowing a user to view, manipulate, input data and store the detail table.

15. The method of claim 2, further comprising: allowing a user to view, manipulate, relate and store the relationships between the terminations detail table and the parts table.

16. The method in claim 2, further comprising: allowing a user to view, manipulate, relate and store the relationships between said parts table and said terminations detail table.

17. The method of claim 4, further comprising: allowing a user to input information and store in said device window table, and view, manipulate, relate and store relationships between at least one said part, one said termination detail and one said part type.

18. The method of claim 17, further comprising: allowing a user to input, view, manipulate and store any remaining additional attributes of the device window table.

19. The method of claim 17, wherein said device windows table has a one-to-many relationship with the parts table and said device window table has a one-to-many relationship with the terminations detail table.

20. The method of claim 17, further comprising: allowing a user to input, view, manipulate, and store additional attributes of the DW that over-write the related native range attribute of the part and the related native hardware and software configuration, conductors and notes attributes of the termination details.

21. The method of claim 1, further comprising of at least on record in a graphic device window table.

22. The method of claim 21, further comprising storing results as a record in said graphic device window table.

23. The method of claim 22, further comprising allowing a user to input, view, manipulate, and store records in said graphic library table.

24. The method of claim 1, further comprising: allowing the user to recall from the said graphic device window table a record with a single action.

25. The method of claim 1, further comprising of at least one point in a generated points table.

26. The method of claim 3, wherein said DW can contain any additional attribute pertinent to itself.

27. The method of claim 26, wherein said attribute is any of: DW abbreviation, DW name, DW quantity, DW designator variable, point designations, total part quantity, unresolved issues and DW type.

28. The method of claim 26, further comprising: allowing a user to input, view, manipulate and store attributes for said DW.

29. The method of claim 1, further comprising: generating at least one point record in said generated points table that is an expansion of said DW.

30. The method of claim 29, further comprising: using computer commands and said DW designator variable to designate a location in said DW abbreviation and said DW name.

31. The method of claim 29, further comprising: said inserting point designations in place of said designator variable.

32. The method of claim 25, further comprising of using computer commands to expand DWs into points by relating all of the parts, termination detail and DW attributes as point attributes in the said generated points table.

33. The method of claim 1, further comprising of at least one solution in a solutions table.

34. The method of claim 33, wherein said solutions table has a one-to-many relationship with said device windows table.

35. The method of claim 33, further comprising: allowing a user to view, manipulate, input and store information in the solutions table.

36. The method of claim 1, further comprising of at least one system in a generated systems table.

37. The method of claim 33, further comprising:
inputting said solution, wherein said solution comprises a solution abbreviation, a solution name, solution quantity and a system designation;
identifying a designator variable;
using said designator variable to designate a location in said solution abbreviation and said solution name, and inserting system designations in place of said designator variable; and
generating said system in a generated systems table that is an expansion of said solution.

38. The method of claim 33, further comprising: expanding solutions into systems by relating and storing all of the solution record attributes into systems by relating all of the solution attributes as system attributes in the generated systems table.

39. The method of claim 1, further comprising: expanding DWs within solutions into points within systems by relating and storing all of the solution record and device window record attributes into the point attributes and system attributes within the generated systems and generated points tables.

40. The method of claim 1, further comprising of at least one controller location in a controller location table.

41. The method of claim 40, wherein said a controller location must contain at least one controller.

42. The method of claim 40, wherein the relationship between said controller locations table and said generated points in said generated points table is completely arbitrary.

43. The method of claim 40, further comprising: allowing a user to name controller locations and view, manipulate, arbitrarily assign and store the relationships between the generated points in the generated points table and the controller locations table.

44. The method of claim 43, further comprising: allowing a user to view, by generated system, only those generated points for that generated system.

45. The method of claim 43, wherein said the relations between the controller locations and all of the points are stored with the points.

46. The method of claim 1, further comprising of at least one controller in a controller table.

47. The method of claim 46, wherein a controller must contain at least one point.

48. The method of claim 46, wherein the relationship between the controllers table and the generated points in the generated points table is completely arbitrary.

49. The method of claim 46, further comprising: allowing a user to name controllers, and view, manipulate, assign and store relationships between for those points assigned to controller locations and the controller.

50. The method of claim 49, further comprising: allowing a user to relate a part from the parts table to said controller.

51. The method of claim 49, wherein said controller has a one-to-one relationship with said part from the parts table.

52. The method of claim 3, wherein said parts can be delineated as controllers including attributes for number of inputs and number of outputs.

53. The method of claim 49, further comprising: allowing a user to view information resulting from point assignment to a specific part related to the controller making it possible for the user to evaluate to the controller based on the point assignment.

54. The method of claim 49, wherein the relationships between all of the controllers and every point are stored with the point.

55. The method of claim 1, further comprising of at least one power conditioning device in a power conditioning table.

56. The method of claim 55, further comprising: allowing a user to name power conditioning devices, select a part for and view, manipulate, arbitrarily assign and store the relationships between the parts related to the generated points in the generated points table and the power conditioning table.

57. The method of claim 55, further comprising: allowing a user, by controller location, to view the list of parts and at least one attribute related to the part associated with the power type and required amount of power for the part as related to the points assigned to a controller location.

58. The method of claim 55, further comprising: allowing a user to input information for, view, manipulate, assign and store relationships about the power conditioning devices.

59. The method of claim 1, further comprising of possibly one enclosure in an enclosure table.

60. The method of claim 59, further comprising: allowing a user to create and name enclosures, select a part for, and view, manipulate, arbitrarily assign and store the relationships between the parts related to the generated points in the generated points table and the enclosures table.

61. The method of claim 59, further comprising: allowing a user, by controller location, to view the list of parts and at least one attribute related to the part associated with the mounted area of the part as related to the points assigned to a controller location.

62. The method of claim 59, further comprising: allowing a user to input information for, view, manipulate, assign and store relationships about the enclosures.

63. The method of claim 1, further comprising of at least one page location for said DW in a page location table.

64. The method of claim 63, further comprising of a scheme to locate the DW on a printed page.

65. The method of claim 63, further comprising allowing a user to assign said scheme to every said DW.

66. The method of claim 63, further comprising allowing a user visually understand, assign and otherwise manipulate the position the page location of the DW on a representation of a printed page.

67. The method of claim 63, further comprising swapping device window page locations among DWs.

68. The method of claim 1, further comprising allowing a user to view all of the controllers and some related information about the controllers in the control system.

69. The method of claim 1, further comprising of the possibility of one network in a network table.

70. The method of claim 69, further comprising: allowing a user to create, and name networks and view, manipulate, arbitrarily assign and store the relationships between the controllers and the networks.

71. The method of claim 69, further comprising: allowing a user to view, manipulate, assign and store relationships about the networks.

72. The method of claim 69, further comprising: allowing a user to view all of the controllers with the related network information.

73. The method of claim 1, further comprising: allowing a user to select a file location.

74. The method of claim 73 further comprising: using all of the information related to a controller to create a software file representative of a DDC controller database.

75. The method of claim 1 further comprising: generating at least one report.

76. The method of claim 1 further comprising storing information for more than one said DW at a time.

77. The method of claim 76 further comprising that said stored information can be recalled and applied with a single action for any number of said DWs saved.

78. A computer system for engineering a control system, comprising:
    instructions for controlling said computer system to engineer said control system by:
    receiving user input information;
    analyzing said user input information in order to engineer a device window record by independently assigning a part and a termination detail for said device window record;
    storing for every solution said user input information as device windows in a device window table;
    using computer commands to expand single and typical device windows as individual points;
    using computer commands to expand single and typical solutions as individual systems;
    assigning for every point in every system a controller location;
    engineering said controller locations;
    assigning for every point in every system a controller; and
    engineering said controllers.

79. An article of manufacture comprising:
    a computer readable medium containing computer readable program code embodied therein for causing a computer system to engineer a control system, the computer readable program coding means in said article of manufacture comprising:
    computer readable program code for causing said computer system to receive user input information;
    computer readable program code for causing said computer system to analyze said user input information in order to engineer a device window record by independently assigning a part and a termination detail for said device window record;
    computer readable program code for causing said computer system to store for every solution said user input information as DWs in a device window table;
    computer readable program code for causing said computer system to use computer commands to expand single and typical DWs as individual points;
    computer readable program code for causing said computer system to use computer commands to expand single and typical solutions as individual systems;
    computer readable program code for causing said computer system to assign for every point in every system a controller location;
    computer readable program code for causing said computer system to engineer said controller locations;
    computer readable program code for causing said computer system to assign for every point in every system a controller; and
    computer readable program code for causing said computer system to engineer said controllers.

* * * * *